(12) United States Patent
Yamamichi

(10) Patent No.: US 11,842,099 B2
(45) Date of Patent: Dec. 12, 2023

(54) MANAGEMENT SYSTEM TO PERFORM LOGIN PROCESSING FOR USER OF CLIENT TERMINAL, ACQUIRE ENTRY-EXIT INFORMATION AND PROVIDE LIST OF PRINTERS INSTALLED IN A STORE, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masaki Yamamichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/821,702

(22) Filed: Aug. 23, 2022

(65) Prior Publication Data
US 2023/0064295 A1    Mar. 2, 2023

(30) Foreign Application Priority Data

Aug. 31, 2021 (JP) .................................. 2021-140735

(51) Int. Cl.
*G06F 3/12* (2006.01)
*H04L 67/51* (2022.01)

(52) U.S. Cl.
CPC .......... *G06F 3/1222* (2013.01); *G06F 3/1204* (2013.01); *G06F 3/1238* (2013.01); *G06F 3/1255* (2013.01); *G06F 3/1261* (2013.01); *G06F 3/1226* (2013.01); *G06F 3/1288* (2013.01); *H04L 67/51* (2022.05)

(58) Field of Classification Search
USPC ............................................... 358/1.14–1.15
See application file for complete search history.

(56) References Cited

U.S. PATENT DOCUMENTS

| | | | | |
|---|---|---|---|---|
| 8,224,909 B2* | 7/2012 | Bloomfield | ........ | H04N 1/00209 358/1.15 |
| 2005/0179937 A1* | 8/2005 | Horihata | ............ | H04N 1/32776 358/1.15 |
| 2007/0198102 A1* | 8/2007 | Umehara | .............. | G06F 3/1247 700/32 |
| 2009/0002750 A1* | 1/2009 | Arai | ...................... | G06F 3/1242 358/1.15 |

(Continued)

FOREIGN PATENT DOCUMENTS

JP          2006251863 A          9/2006

*Primary Examiner* — Haris Sabah
(74) *Attorney, Agent, or Firm* — CANON U.S.A., INC. IP Division

(57) ABSTRACT

A management system is configured to communicate with a client terminal via a network and provide a store management service. The management system includes one or more memories storing a set of instructions, and one or more processors that execute the set of instructions to perform login processing for a user of the client terminal to log in to the management service, based on a login request from the client terminal, acquire store entry and exit information about the user, and provide the client terminal with information about one or more print apparatuses installed in a store that the user has entered, based on the acquired store entry and exit information.

7 Claims, 12 Drawing Sheets

(56) References Cited

U.S. PATENT DOCUMENTS

2011/0312343 A1* 12/2011 Jhanji ................ G06Q 30/0259
                                                    455/456.1
2014/0085665 A1* 3/2014 Sheldon ................ G06F 3/1205
                                                    358/1.15

* cited by examiner

FIG.10A

1000 — PRINT JOB INPUT SCREEN

SELECT FILE FOR PRINTING

[SELECT FILE] [FILE NAME] ← 1001

[PRINT IMMEDIATELY] [UPLOAD] [CANCEL]
         1002         1003     1004

FIG.10B

1010 — PRINTER SELECTION SCREEN

SELECT PRINTER FOR PRINTING ← 1011

| STORE A – COLOR PRINTER |
| STORE A – BLACK AND WHITE PRINTER |

[OK] [CANCEL]
1012  1013

FIG.10C

1020 — PRINTER SELECTION SCREEN

INPUT PRINTER CODE OF PRINTER FOR PRINTING

PRINTER CODE [XXXXXXXXXXXXXX] ← 1021
PRINTER [STORE A – COLOR PRINTER] ← 1022

[OK] [CANCEL]
1023  1024

MANAGEMENT SYSTEM TO PERFORM LOGIN PROCESSING FOR USER OF CLIENT TERMINAL, ACQUIRE ENTRY-EXIT INFORMATION AND PROVIDE LIST OF PRINTERS INSTALLED IN A STORE, CONTROL METHOD, AND NON-TRANSITORY COMPUTER-READABLE STORAGE MEDIUM

BACKGROUND

Field of the Disclosure

The present disclosure relates to a management system, a client terminal, a control method, and a storage medium for performing printing in a public space.

Description of the Related Art

In recent years, a print system using a cloud print service in which a print job is transmitted from a personal computer (PC) to an image forming apparatus via a cloud and printing is performed for the print job has started to be widely used. In such a print system, first, an administrator registers an image forming apparatus, as a device, in a tenant of the cloud print service to which the administrator belongs. The administrator sets whether the image forming apparatus is allowed to be used, for each user belonging to the tenant. The tenant refers to a service system deployed on a cloud by a user, and has an access-restricted storage area dedicated to a registered user. For example, in a company-A tenant of the cloud print service used in a company A, an employee of the company A is registered as a user and an image forming apparatus of the company A is registered. The user of the company A can thereby perform printing using any image forming apparatus registered in the company-A tenant, by inputting a print job to the company-A tenant from a terminal in the company A.

Meanwhile, because of diversification of ways of working, there is a demand for printing a document stored in a client terminal, using an image forming apparatus installed in a public space such as a convenience store, a library, or a station.

To meet the demand, a cloud print service for printing in a public space has also been widely used. This is a cloud print service using a configuration generally called a public cloud and has, for example, a public print tenant. Such a cloud print service will be referred to as a "public print service". In the public print service, user management based on the public print tenant can be performed, or a guest print function can be provided regardless of the presence or absence of user management. An image forming apparatus for printing in a public space is registered in the public print tenant and managed.

Further, it is conceivable that not only a conventional office but also a shared office and a coworking space are used because of the acceleration of use of telework, and a user who wants to perform printing is to perform printing using an image forming apparatus installed in a shared office. There are also provided space matching services in which, when using these stores, a user searches for a store beforehand, makes a reservation, uses the store, and pays a fee corresponding to a use time of the user. In these services, a store entry time and a store exit time of the user are managed to determine the use time of the user.

The following two types are mainly conceivable as a print method using the public print service in a shared office or a coworking space. The first type is a first method in which, after a job is input to the public print service, user authentication is performed and then an output is produced based on an execution instruction for the job using an image forming apparatus. The second type is a second method in which an image forming apparatus is designated as an output destination when a job is input to the public print service, and the image forming apparatus immediately executes the job upon receiving the job.

Japanese Patent Application Laid-Open No. 2006-251863 discusses a method related to the above-described second method. According to the method discussed in Japanese Patent Application Laid-Open No. 2006-251863, when a print instruction is issued on a client terminal, a network address is extracted from each of an Internet Protocol (IP) address of an image forming apparatus selected by a user and an IP address of the client terminal, and whether the addresses are both within the same network range is determined. In a case where these addresses are not within the same network range, the user is warned to select an image forming apparatus again. This can prevent an output from an image forming apparatus not intended by the user.

With the above-described first method, a user operation for issuing a print execution instruction is performed using the image forming apparatus to be the output destination, and thus there is such an advantage that the image forming apparatus to be the output destination can be reliably identified. Meanwhile, with the second method, there is such an advantage that a job input instruction and a print execution instruction are issued at the same time on a client terminal. However, with the second method, an image forming apparatus is to be designated as an output destination in advance, and thus, if a user makes a mistake in designating an image forming apparatus as the output destination, an output can be produced by an image forming apparatus not intended by the user.

In the case of printing using the public print service, it is also conceivable that a job is input using a public line or a network line different from a network in a store. For this reason, a client terminal and an image forming apparatus in the same store are not necessarily within the same network range. Thus, in a case where the above-described method discussed in Japanese Patent Application Laid-Open No. 2006-251863 is applied to printing using the public print service, there is a possibility that a print job input from a client terminal cannot be executed in an image forming apparatus in the same store.

In addition, image forming apparatuses installed in a plurality of shared offices and co-working spaces are registered in the public print service. If a user is enabled to select an image forming apparatus as the output destination based on the network range as discussed in Japanese Patent Application Laid-Open No. 2006-251863, an image forming apparatus installed outside the store can be designated by mistake. In a case where the user makes a mistake in selecting an image forming apparatus as the output destination and an output product is produced by an image forming apparatus in another store, it is difficult to collect the output product as compared with a case where an output product is produced by an image forming apparatus in the office, and there is also an issue where such a mistake can lead to an information leakage.

SUMMARY

Embodiments of the present disclosure are directed to a mechanism that enables a user to issue a print instruction from a client terminal after appropriately selecting an image forming apparatus, in a public print service.

According to embodiments of the present disclosure, a management system configured to communicate with a client terminal via a network and provide a store management service includes one or more memories storing a set of instructions, and one or more processors that execute the set of instructions to perform login processing for a user of the client terminal to log in to the management service, based on a login request from the client terminal, acquire store entry and exit information about the user, and provide the client terminal with information about one or more print apparatuses installed in a store that the user has entered, based on the acquired store entry and exit information.

Further features of the present disclosure will become apparent from the following description of exemplary embodiments with reference to the attached drawings.

BRIEF DESCRIPTION OF THE DRAWINGS

FIGS. 10A to 10C are diagrams each illustrating an example of a user interface in printing.

DESCRIPTION OF THE EMBODIMENTS

Exemplary embodiments of the present disclosure will be described below with reference to the drawings.

Figure 1:
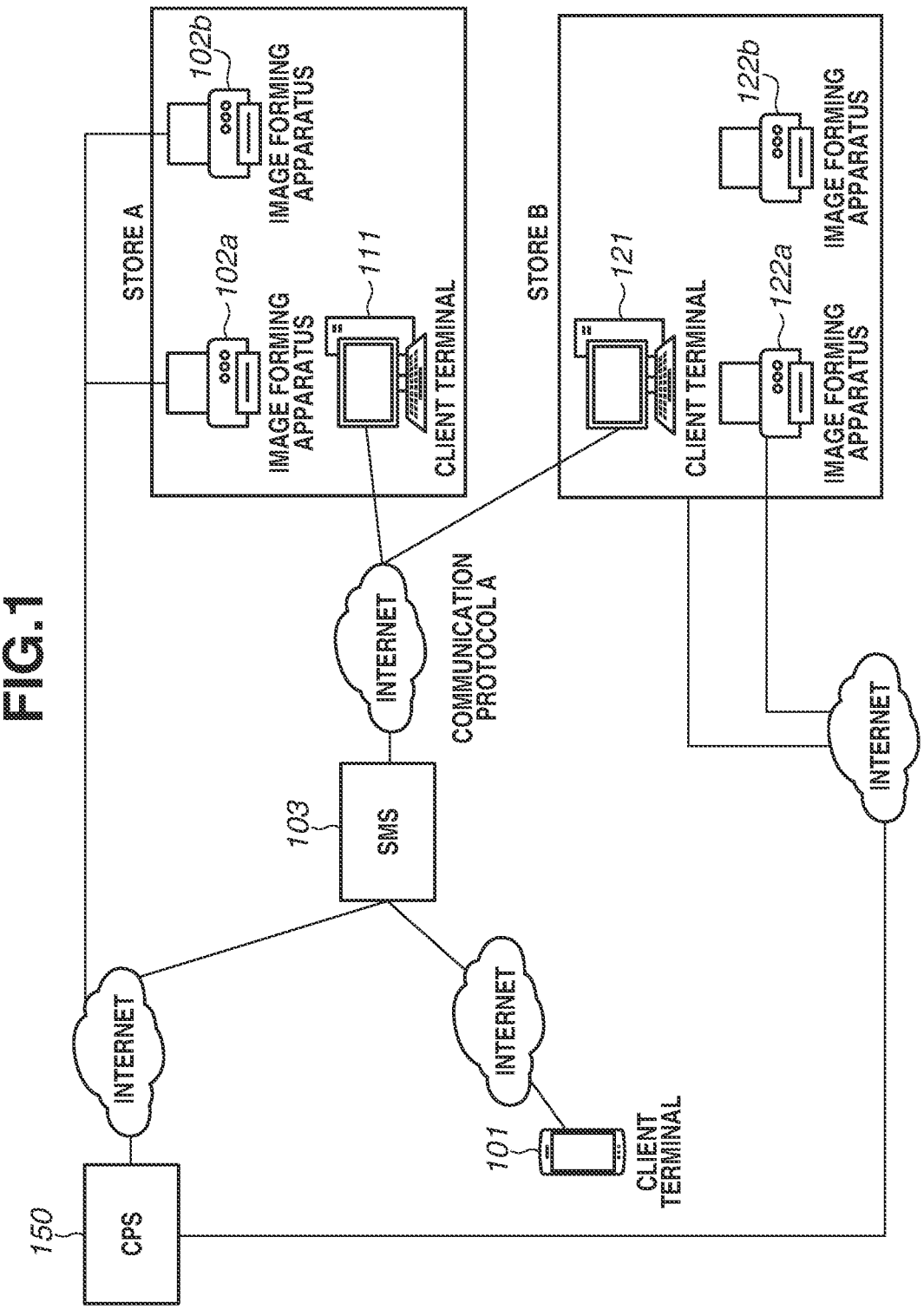
FIG. 1 is a diagram illustrating an overall configuration of a system.

FIG. 1 is a diagram illustrating an overall configuration of a system according to a first exemplary embodiment of the present disclosure.

A space matching service (hereinafter referred to as an SMS) 103 is a management system that provides a store management service, including searching for a store to be used, and making a reservation for the store, and paying a fee corresponding to a time during which the store is used. A client terminal and image forming apparatuses are present in each of a store A and a store B that can be used from the SMS 103. More specifically, a client terminal 111 and image forming apparatuses 102a and 102b are in the store A, and a client terminal 121 and image forming apparatuses 122a and 122b are in the store B.

The SMS 103 provides a print function in cooperation with a cloud print service (hereinafter referred to as a CPS) 150, receives a print job from a client terminal 101, and saves the received print job. Furthermore, the SMS 103 transmits job information to the CPS 150. The CPS 150 receives a request for a print job from the image forming apparatus 102a, 102b, 122a, or 122b, and transmits the print job to the corresponding image forming apparatus. The CPS 150 is a print system that provides a print service. Each of the image forming apparatuses 102a, 102b, 122a, and 122b performs printing upon receiving the print job from the CPS 150.

Similarly, a print job can also be transmitted from the client terminal 111 in the store A or the client terminal 121 in the store B to the SMS 103.

The SMS 103, the CPS 150, the client terminal 101, the client terminal 111 and the image forming apparatuses 102a and 102b in the store A, and the client terminal 121 and the image forming apparatuses 122a and 122b in the store B are communicatively connected via the Internet. In the present exemplary embodiment, the SMS 103 mainly providing the functions such as making a reservation for a store and the CPS 150 mainly providing the print function are described as different services, but one service that provides the functions of both of the services may be used. Further, in the present exemplary embodiment, the SMS 103 is configured to provide a print job input screen, but the CPS 150 may provide this screen, or either of these services may provide a function and a screen to be used for printing.

Figure 2:
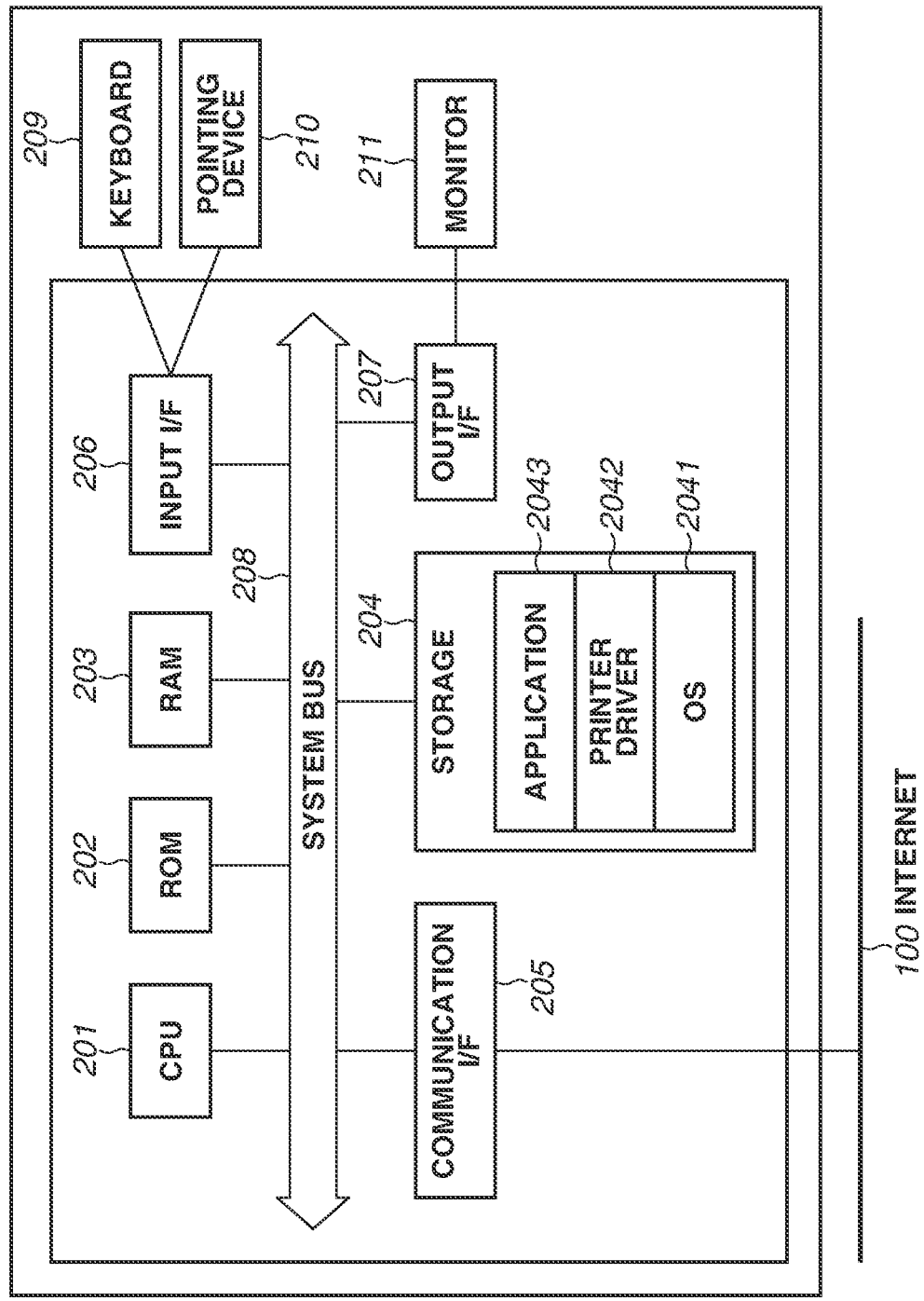
FIG. 2 is a diagram illustrating a hardware configuration example.

FIG. 2 is a diagram illustrating an example of a hardware configuration of a server computer located at a datacenter, for the purpose of building each of the SMS 103 and the CPS 150 illustrated in FIG. 1. A similar hardware configuration of a general information processing apparatus can also be applied to each of the client terminals 101, 111, and 121 and the image forming apparatuses 102a, 102b, 122a, and 122b according to the present exemplary embodiment.

A central processing unit (CPU) 201 directly or indirectly controls devices (such as a read only memory (ROM) 202 and a random access memory (RAM) 203) connected via an internal device (a system bus 208), and executes a program for implementing the present exemplary embodiment. The ROM 202 stores a basic input/output system (BIOS). The RAM (direct memory) 203 is used as a work area of the CPU 201, and used as a primary storage for loading a software module for implementing the present exemplary embodiment. A storage 204 stores an operating system (OS) 2041 that is basic software, an application 2043, and a printer driver 2042 that is a general-purpose driver. Specific examples of the storage 204 include a hard disk drive (HDD) and a solid state drive (SSD). An output interface (I/F) 207 is an interface for connecting to a monitor 211 or the like. An input I/F 206 is an interface for connecting to a keyboard 209, a pointing device 210 such as a mouse, and the like. A communication I/F 205 is an interface for connecting to the Internet 100 or a network. The SMS 103 receives processing requests from the client terminals 101, 111, and 121, the image forming apparatuses 102a, 102b, 122a, and 122b, and the CPS 150 via the communication I/F 205, performs various types of processing, and transmits and receives information.

Figure 3:
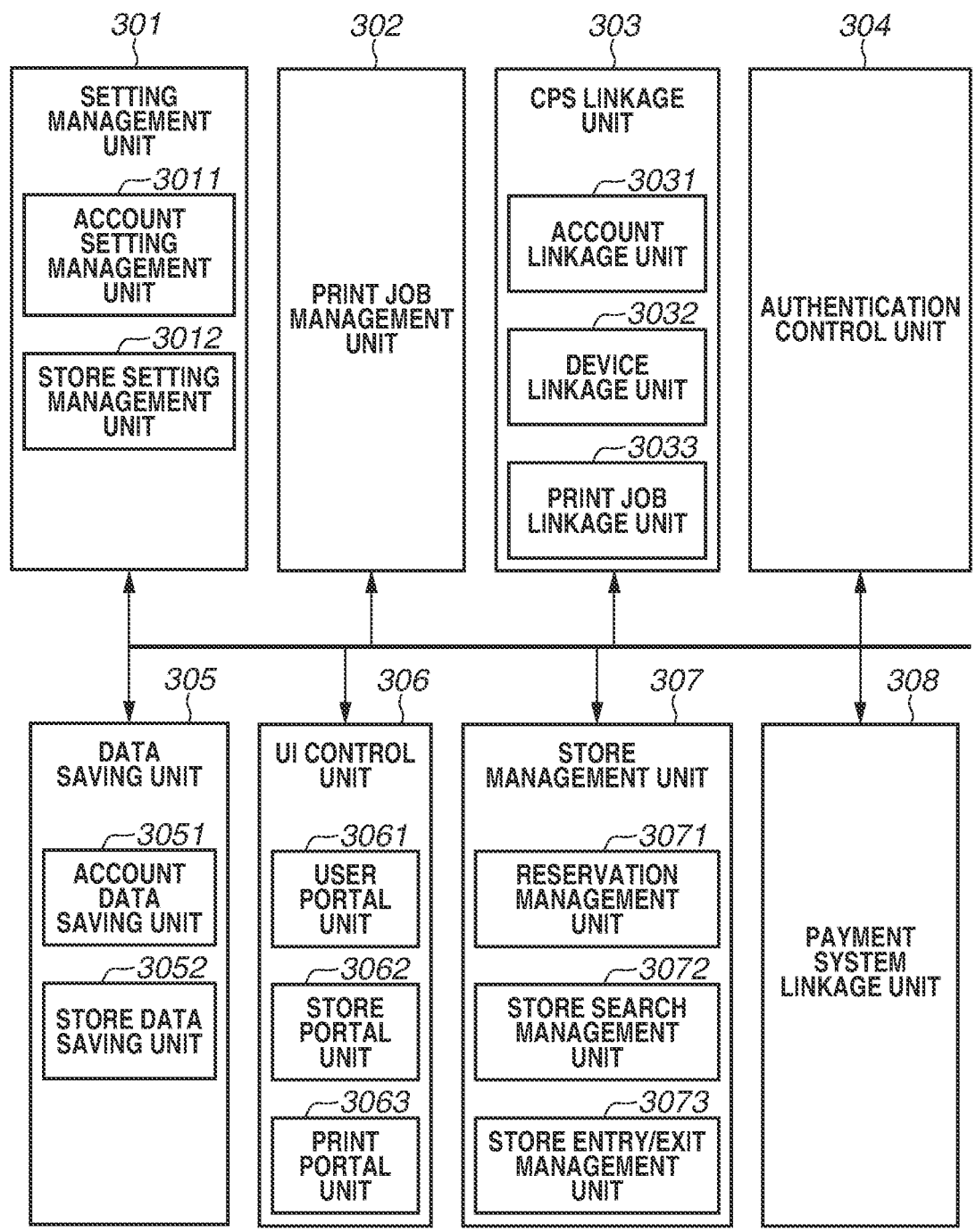
FIG. 3 is a diagram illustrating an example of a software configuration of a space matching service.

FIG. 3 is a diagram illustrating an example of a software configuration of the SMS 103 according to the present exemplary embodiment.

The software configuration illustrated in FIG. 3 is implemented by the CPU 201, for example, loading a program stored in the ROM 202 into the RAM 203 and executing the program.

A setting management unit 301 stores settings about various functions of the SMS 103 into each of storage devices such as the RAM 203 and the storage 204, and reads out the settings from each of the storage devices. The setting management unit 301 includes an account setting management unit 3011 and a store setting management unit 3012. The account setting management unit 3011 saves information about a user to an account data saving unit 3051 of a data saving unit 305 when the user is registered. The information about the user includes a user identification (ID) (an account name), a login password, e-mail information, and whether the user has checked in at the store, but the information about the user is not limited thereto. The account setting management unit 3011 transmits a part of account data to the CPS 150 via an account linkage unit 3031 of a CPS linkage unit 303. When a store administrator registers a store of the administrator in the SMS 103, the store setting management unit 3012 saves information about the store to a store data saving unit 3052 of the data saving unit 305. The information about the store includes the ID of the store, information about the location of the store, store fees, and facilities, but is not limited thereto.

A print job management unit 302 transmits a print job and print job related information received from the client terminal 101, 111, or 121, to the CPS 150 via a print job linkage unit 3033 of the CPS linkage unit 303.

Figure 9:
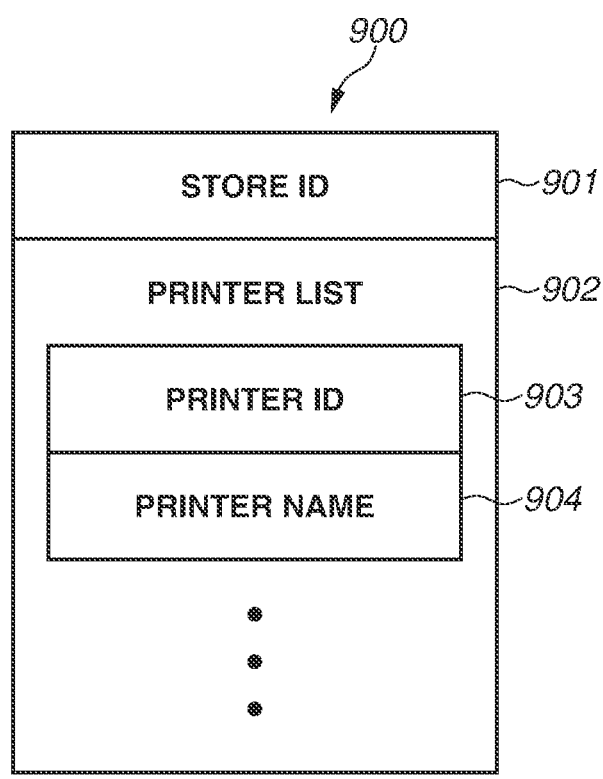
FIG. 9 is a diagram illustrating an example of a data structure of store printer management information.

The CPS linkage unit 303 includes the account linkage unit 3031, a device linkage unit 3032, and the print job linkage unit 3033. The account linkage unit 3031 mainly performs registration or deletion of a user to or from the CPS 150, and exchanges account information. The device linkage unit 3032 acquires device information about the image forming apparatuses 102a, 102b, 122a, and 122b installed in the stores A and B, from the CPS 150 in which the image forming apparatuses 102a, 102b, 122a, and 122b are registered beforehand. The device information includes a printer ID, a printer name, and store information about a store where the printer is installed, and the device information acquired by the device linkage unit 3032 is held as store printer management information 900 illustrated in FIG. 9.

The store printer management information 900 is information about a list of printers installed in a store. A store ID 901 uniquely identifies the store. A printer list 902 is a list of pieces of device information about image forming apparatuses installed in the store corresponding to the store ID 901. A printer ID 903 and a printer name 904 are included in the printer list 902.

The print job linkage unit 3033 transmits a print job to the CPS 150, and acquires a print log from the CPS 150 as a print result.

An authentication control unit 304 performs particularly login related control in the account setting management unit 3011. The authentication control unit 304 may cooperate with an external authentication service.

The data saving unit 305 saves each piece of setting data in response to a request from the account setting management unit 3011 or the store setting management unit 3012.

A user interface (UI) control unit 306 generates a screen and transmits the generated screen, in response to a request from the client terminal 101, 111, or 121. The UI control unit 306 includes a user portal unit 3061, a store portal unit 3062, and a print portal unit 3063. The user portal unit 3061 provides a screen related to use of a store to a user. For example, the user can make a store reservation and confirms a use history on this screen. The store portal unit 3062 mainly provides a screen to be used by a store administrator, and the administrator can input information about the store and confirm a use status of the store on this screen. The print portal unit 3063 provides a screen related to printing, and this screen is displayed on the monitor 211 of the client terminal 101, 111 or 121, so that a print job can be input by drag and drop and the status of the print job can be confirmed.

Figure 7:
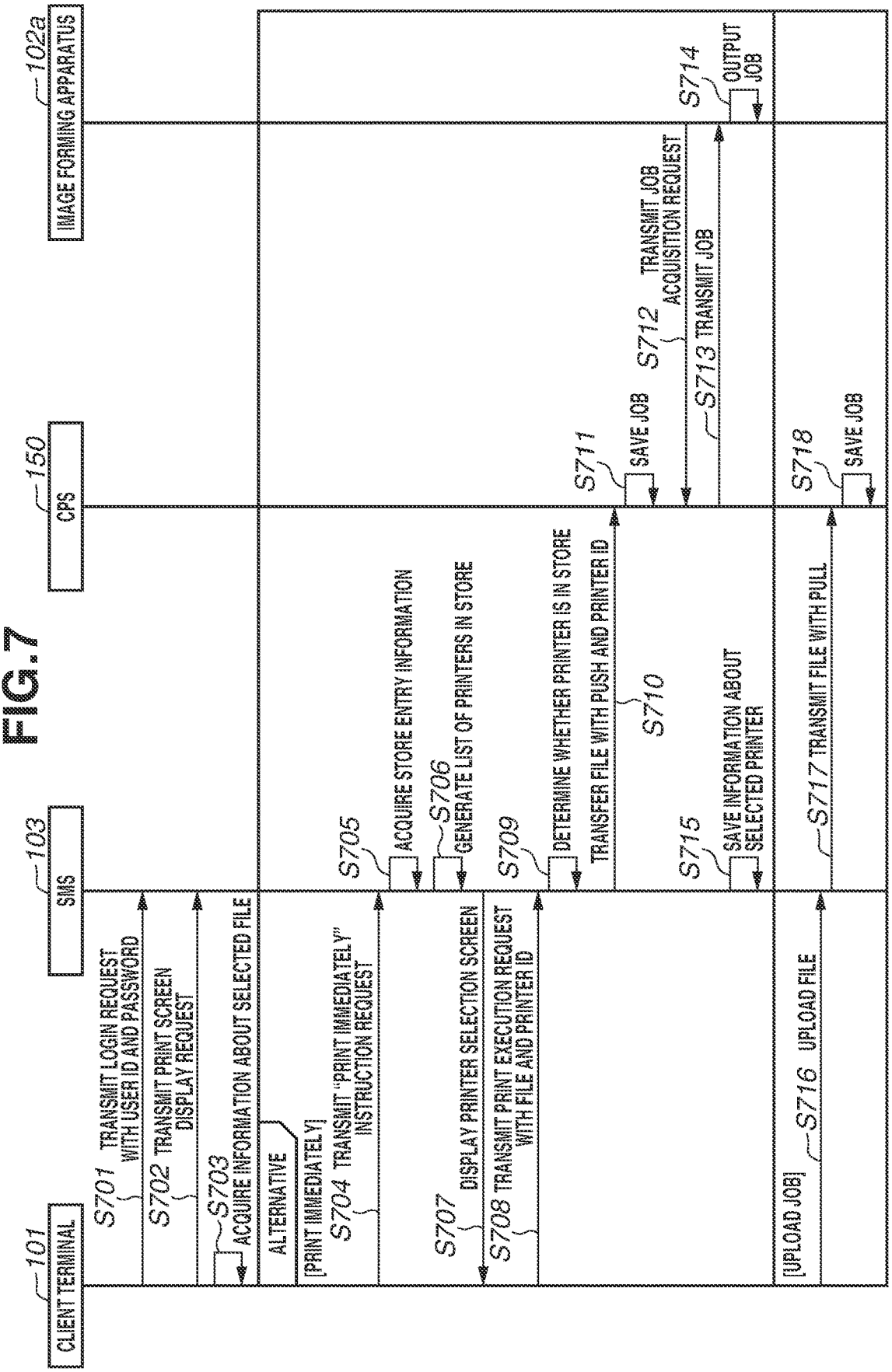
FIG. 7 is a sequence diagram illustrating a procedure of processing in printing.

A store management unit 307 includes a reservation management unit 3071, a store search management unit 3072, and a store entry/exit management unit 3073. The reservation management unit 3071 manages reservations for stores to be used, via the user portal unit 3061. The store search management unit 3072 searches for a store that meets needs of the user, based on the information in the store data saving unit 3052 and current store availability. For example, the store search management unit 3072 can display a map, identify the current position of the user, and search for a store near the identified position, or search for a store near a designated location. The store entry/exit management unit 3073 manages check-in and check-out of the user who has made a reservation. Processing for the check-in and check-out of the user by the SMS 103 is illustrated in FIG. 7 (described below).

A payment system linkage unit 308 calculates a fee based on the store use status of the user and the print log acquired by the print job linkage unit 3033. Further, the payment system linkage unit 308 enables payment of an incurred fee in cooperation with an external service.

Figure 4:
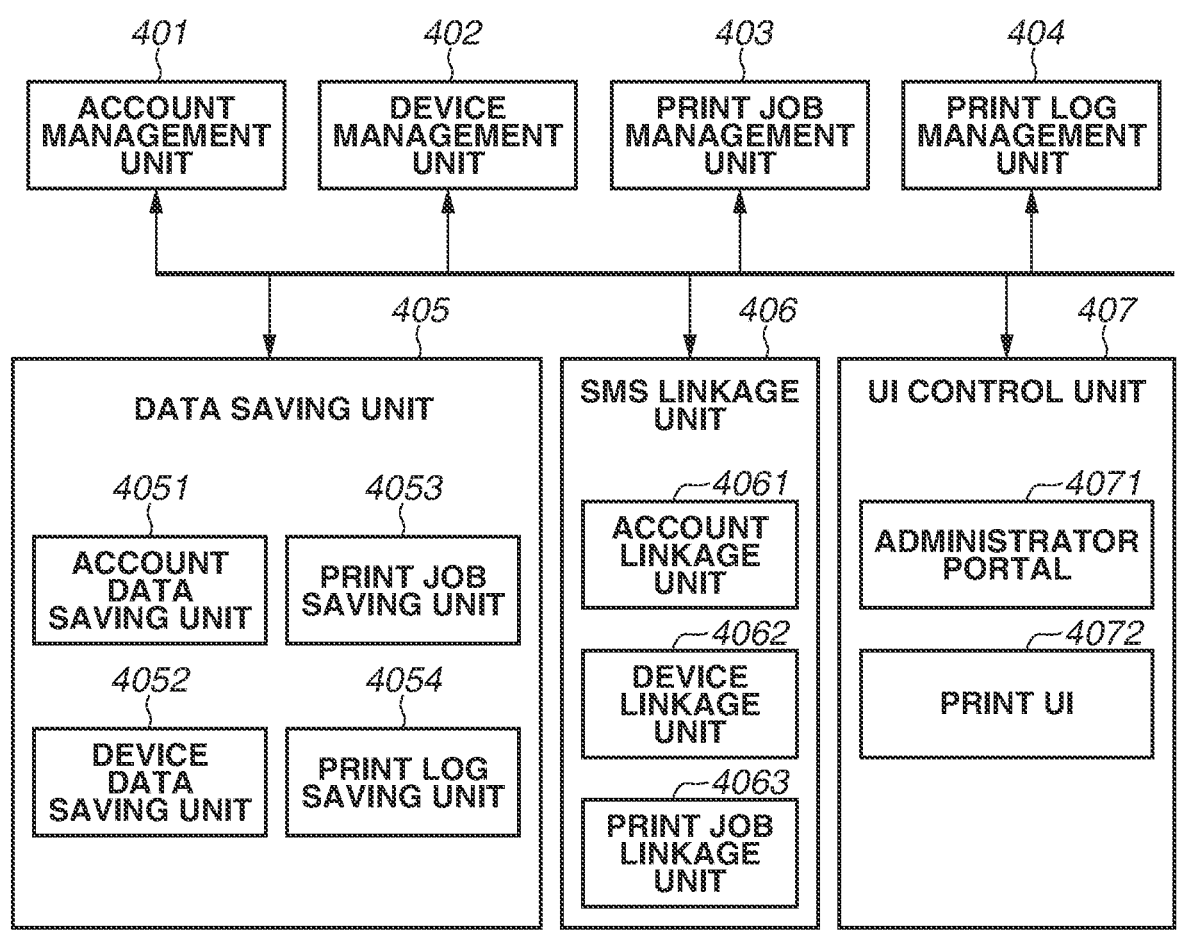
FIG. 4 is a diagram illustrating an example of a software configuration of a cloud print service

FIG. 4 is a diagram illustrating an example of a software configuration of the CPS 150 according to the present exemplary embodiment.

The software configuration illustrated in FIG. 4 is implemented by the CPU 201, for example, loading a program stored in the ROM 202 into the RAM 203 and executing the program.

An account management unit 401 performs registration or deletion of an account, and management of a login status of an account. Information about a registered account is saved to an account data saving unit 4051 of a data saving unit 405. Further, the account management unit 401 performs registration or deletion of a designated user, and exchange of user information about the designated user, via an account linkage unit 4061 of an SMS linkage unit 406.

A device management unit 402 performs registration or deletion of a device, and management of a use status of a device. Information about a registered device is saved to a device data saving unit 4052 of the data saving unit 405. Further, the device management unit 402 exchanges designated device information via a device linkage unit 4062 of the SMS linkage unit 406.

A print job management unit 403 receives a print job or transmits a print job. The received print job is saved to a print job saving unit 4053 of the data saving unit 405, and the print job is transmitted to a designated device in response to a request from, for example, the image forming apparatus 102a or 102b. The print job management unit 403 can also receive a print job via a print job linkage unit 4063 of the SMS linkage unit 406.

A print log management unit 404 acquires a print log from, for example, the image forming apparatus 102a or 102b. The print log refers to contents set and output by the user, such as a print sheet size, color or monochrome, and double-sided printing or single-sided printing.

The data saving unit 405 saves account information, device information, and the like, using each of the storage devices such as the RAM 203 and the storage 204 of the CPS 150. The data saving unit 405 includes the account data saving unit 4051, the device data saving unit 4052, the print job saving unit 4053, and a print log saving unit 4054. The account data saving unit 4051 saves account related information. The account information is information about a user registered in the CPS 150, and includes information for identifying the user, and information about a department to which the user belongs, and account authority information. The device data saving unit 4052 saves information about a device registered in the CPS 150, including the model name of the device, information for identifying the device, and information about the location of the device. The print job saving unit 4053 saves a print job to be saved in the CPS 150, and bibliographic information about the print job. The print log saving unit 4054 saves a print result acquired from a device that has output a print job.

The SMS linkage unit 406 includes the account linkage unit 4061, the device linkage unit 4062, and the print job linkage unit 4063. The account linkage unit 4061 mainly accepts instructions for user registration, deletion, and change from the SMS 103, and further, exchanges account information. The device linkage unit 4062 accepts instructions for registration and deletion of, for example, the image forming apparatus 102*a* and 102*b* from the SMS 103. The print job linkage unit 4063 mainly receives a print job from the SMS 103, and transmits a print log saved as a print result by the print log saving unit 4054 to the SMS 103.

A UI control unit 407 generates a screen in response to a request from the client terminal 101, 111, or 121, or the image forming apparatus 102*a*, 102*b*, 122*a*, or 122*b*, and transmits the generated screen. The UI control unit 407 includes an administrator portal 4071 and a print UI 4072. The administrator portal 4071 provides a screen to be used by a store administrator or an operation administrator of the CPS 150. For example, an image forming apparatus can be registered in the CPS 150 on this screen. The print UI 4072 provides a screen related to printing using the image forming apparatus. A list of input print jobs can be confirmed or a print job can be selected to issue a print execution instruction on this screen.

<Check-In and Check-Out at Shop>

Figure 5:
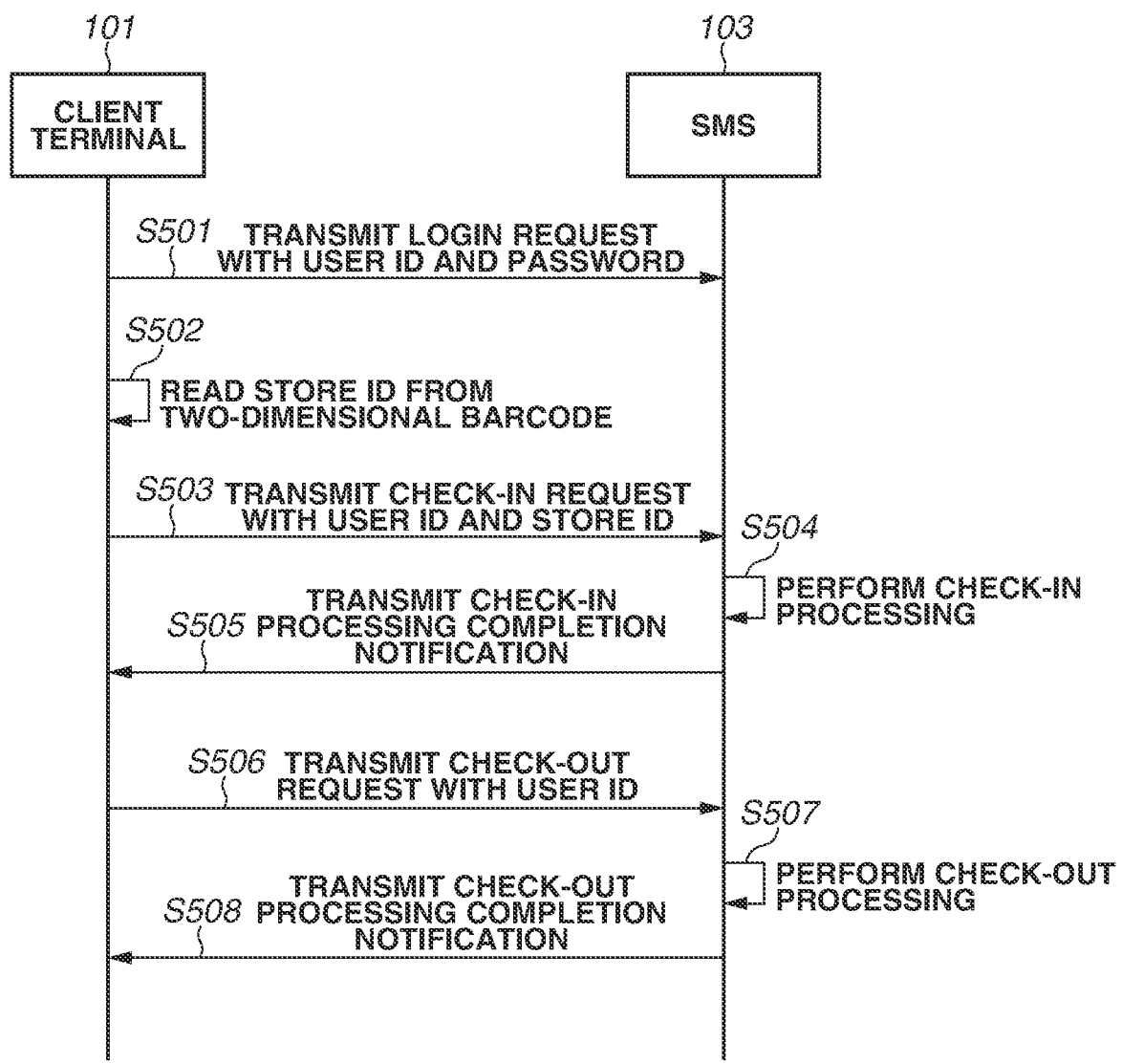
FIG. 5 is a sequence diagram illustrating a procedure of processing from check-in to check-out at a store.

FIG. 5 is a sequence diagram illustrating processing for store entry and exit (check-in and check-out) of a user using the client terminal 101 according to the present exemplary embodiment. For example, processing for check-in is performed by the user reading a two-dimensional barcode for store entry provided in a store after logging in to the SMS 103 using an application in the client terminal 101.

In step S501, the user inputs a user ID and a password and issues a login execution instruction, so that the client terminal 101 performs processing for logging in to the SMS 103.

In step S502, the user scans the two-dimensional barcode for store entry provided in the store, so that the client terminal 101 reads a store ID, as store information, from information in the barcode.

In step S503, the client terminal 101 transmits a check-in request (a store entry request) with the user ID and the store ID for check-in, to the store management unit 307 of the SMS 103.

Figure 6:
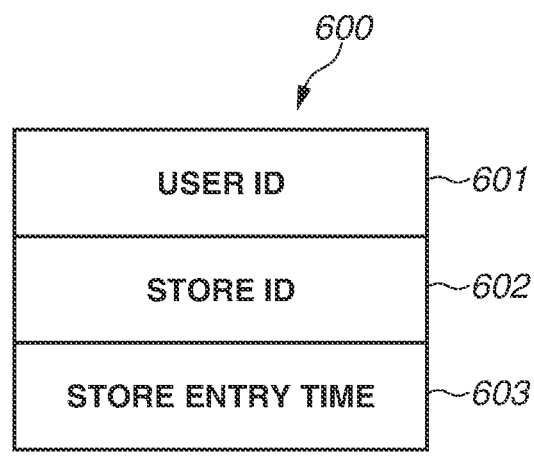
FIG. 6 is a diagram illustrating an example of a data structure of store entry information.

In step S504, the store management unit 307 performs check-in processing for the user. The check-in processing is recorded in current store entry information such as store entry information 600 illustrated in FIG. 6. In a user ID 601, the user ID of the user who has entered the store is held. In a store ID 602, the ID of the store where the user having the user ID 601 is currently present is held. In a store entry time 603, the time when the check-in processing has been performed is held. In this way, at least identification information about the user and identification information about the store that the user has entered are managed in association with each other, as the store entry information 600.

In step S505, the store management unit 307 transmits a check-in processing completion notification to the client terminal 101.

In step S506, the client terminal 101 transmits a check-out request (a store exit request) and the user ID for check-out, to the store management unit 307 of the SMS 103.

In step S507, the store management unit 307 performs check-out processing for the user. In the check-out processing, the store ID 602 and the store entry time 603 are deleted. In other words, the association between at least the identification information about the user and the identification information about the store that the user has entered, which is managed as the current store entry information, is canceled. However, these pieces of information and use history data about when and which store has been used by the user, with the exit time added thereto may be separately held for payment of a fee and confirmation of the use history of the user.

In step S508, the store management unit 307 transmits a check-out processing completion notification to the client terminal 101.

The check-in and check-out processing performed by reading, using the client terminal, the two-dimensional barcode provided by the store has been described above with reference to FIG. 5. However, the check-in and check-out processing may be performed using other methods. Examples of the other methods include a method in which a two-dimensional barcode including store reservation information is displayed on a client terminal, and read by a store, and a method in which a member card issued separately is read by a card reader of a store.

<Print Processing>

FIG. 7 is a sequence diagram illustrating processing for output to a printer in a store that a user has entered, using the client terminal 101 according to the present exemplary embodiment. The processing is implemented by logging in to the SMS 103 from an application in the client terminal 101 and performing print processing.

In step S701, the user inputs a user ID and a password and issues a login execution instruction, so that the client terminal 101 issues a login request to the SMS 103. Upon receiving the login request from the client terminal 101, the SMS 103 performs login processing. In step S702, when an operation for starting the print processing is performed by the user, the client terminal 101 issues a print screen display request to the SMS 103, so that a print job input screen 1000 illustrated in FIG. 10A is displayed on the client terminal 101. In a field 1001, the user can select a print file by pressing a file selection button. The file that can be selected may be a file in the client terminal 101, or a file in an external cloud storage or the like. In step S703, the client terminal 101 acquires information about the file selected by the user and holds the acquired information. The information about the file includes a file name and a file path. When a "print immediately" button 1002 is pressed, the processing proceeds to step S704. When an "upload" button 1003 is pressed, the processing proceeds to step S716. In a case where a "cancel" button 1004 is pressed, the print processing is terminated When the "print immediately" button 1002 is pressed, then in step S704, the client terminal 101 notifies the SMS 103 of a "print immediately" instruction request. In step S705, upon receiving the "print immediately" instruction request, the SMS 103 acquires the store entry information 600 about the logged-in user. In step S706, the SMS 103 generates a list of printers in the store from the printer list 902, by referring to the store ID 602 of the store entry information 600 acquired in step S705 and referring to the store printer management information 900 in which the store ID 602 is identical to the store ID 901. In step S707, the SMS 103 displays a printer selection screen 1010 as illustrated in FIG. 10B, on an operation unit of the client terminal 101. A printer list control 1011 displays the list of printers in the store generated in step S706. When a printer in the store is selected by the user in the printer list control 1011 and an "OK" button 1012 is pressed, the processing proceeds to step S708. In a case where a "cancel" button 1013 is pressed, the print processing is canceled.

In response to the login processing in step S701, the store entry information 600 about the logged-in user may be acquired (in step S705) and further, the list of printers in the store may be generated (in step S706). Alternatively, in response to the print screen display in step S702, the store entry information 600 about the logged-in user may be acquired (in step S705) and further, the list of printers in the store may be generated (in step S706). Moreover, in steps S706 and S707, the information about printers in the store may be provided from the SMS 103 to the client terminal 101, and the list of printers in the store may be generated in the client terminal 101.

Instead of the printer selection screen 1010, a printer selection screen 1020 illustrated in FIG. 10C may be displayed and a printer may be selected based on a printer code. The printer code is used to uniquely identify a printer, and it is conceivable that the SMS 103 or the CPS 150 issues a unique print code to a registered device. When the printer code is input in a printer code input area 1021 by the user, the SMS 103 determines the printer corresponding to the input printer code, based on the printer code, and displays the name of the determined printer in a text box 1022. When an "OK" button 1023 is pressed, the processing proceeds to step S708. When a "cancel" button 1024 is pressed, the print processing is canceled.

In step S708, the client terminal 101 uploads the file selected in step S703 to the SMS 103, and transmits a print execution request to the SMS 103 together with the printer ID corresponding to the printer name selected on the screen illustrated in FIG. 10B or FIG. 10C. In other words, the print execution request transmitted from the client terminal 101 to the SMS 103 includes designation of a print apparatus as an output destination.

In step S709, upon receiving the print execution request, the SMS 103 determines whether the printer corresponding to the printer ID transmitted from the client terminal 101 is in the store. To be more specific, the SMS 103 confirms whether the transmitted printer ID is in the printer list generated in step S706. To perform strict determination, the SMS 103 may perform the processing in steps S705 and 706 again, generate a printer list at the time of print execution, and perform the determination.

If the SMS 103 determines that the printer is in the store in step S709, the processing proceeds to step S710. If the printer is not in the store, the user is notified of this result and printing is canceled. In step S710, the SMS 103 transfers the print data (the file) received in step S708 to the CPS 150. When transferring the print data, the SMS 103 attaches a parameter (push) indicating that printing is to be performed immediately and the printer ID to the print data. In step S711, upon receiving the transmitted file, the CPS 150 generates a print job based on the received file and saves the generated print job. In step S712, when detecting the job with the push parameter attached thereto through periodical job monitoring of the CPS 150, event notification, or the like, the image forming apparatus 102a transmits a job acquisition request to the CPS 150. In step S713, upon receiving the job acquisition request, the CPS 150 transmits the job to the image forming apparatus 102a. In step S714, the image forming apparatus 102a performs output processing on the transmitted print job.

Figure 8:
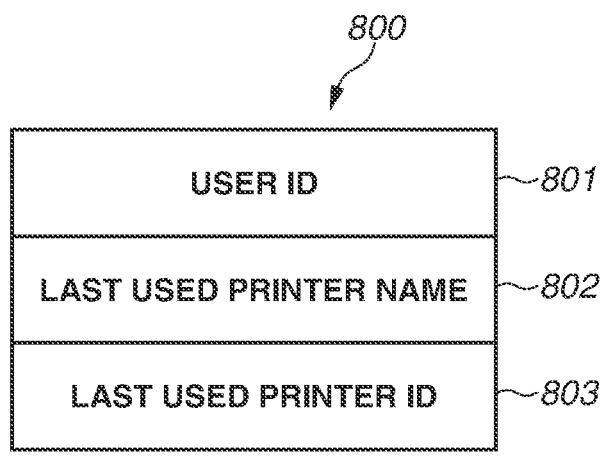
FIG. 8 is a diagram illustrating an example of a data structure of printer last value information.

In step S715, the SMS 103 saves the information about the selected printer that has performed printing, as printer last value information 800 illustrated in FIG. 8, after transmitting the file in step S710. In the printer last value information 800, a last used printer name 802 and a last used printer ID 803 are held in association with a user ID 801. The printer last value information 800 is thereby used as an initial value of a printer to be selected on the printer selection screen displayed in step S707, at the time of the second printing or later. In a case where the initial value of the printer to be selected on the printer selection screen indicates a printer outside the store, the selected printer is determined to be outside the store in step S709, and the user is to select a printer again.

In step S716, the client terminal 101 uploads the file selected in step S703 to the SMS 103. In step S717, upon receiving the file, the SMS 103 transmits the received file to the CPS 150. At this time, the SMS 103 transmits the received file together with a parameter (pull) indicating that a print job is to be held. In step S718, the CPS 150 generates a print job from the received file and saves the generated print job. The print job saved at this time does not have the push parameter attached thereto, and thus is not to be acquired by step S712, and an output is produced for the job when a print instruction is expressly issued by the user who has logged into the image forming apparatus 102a.

Figure 11:
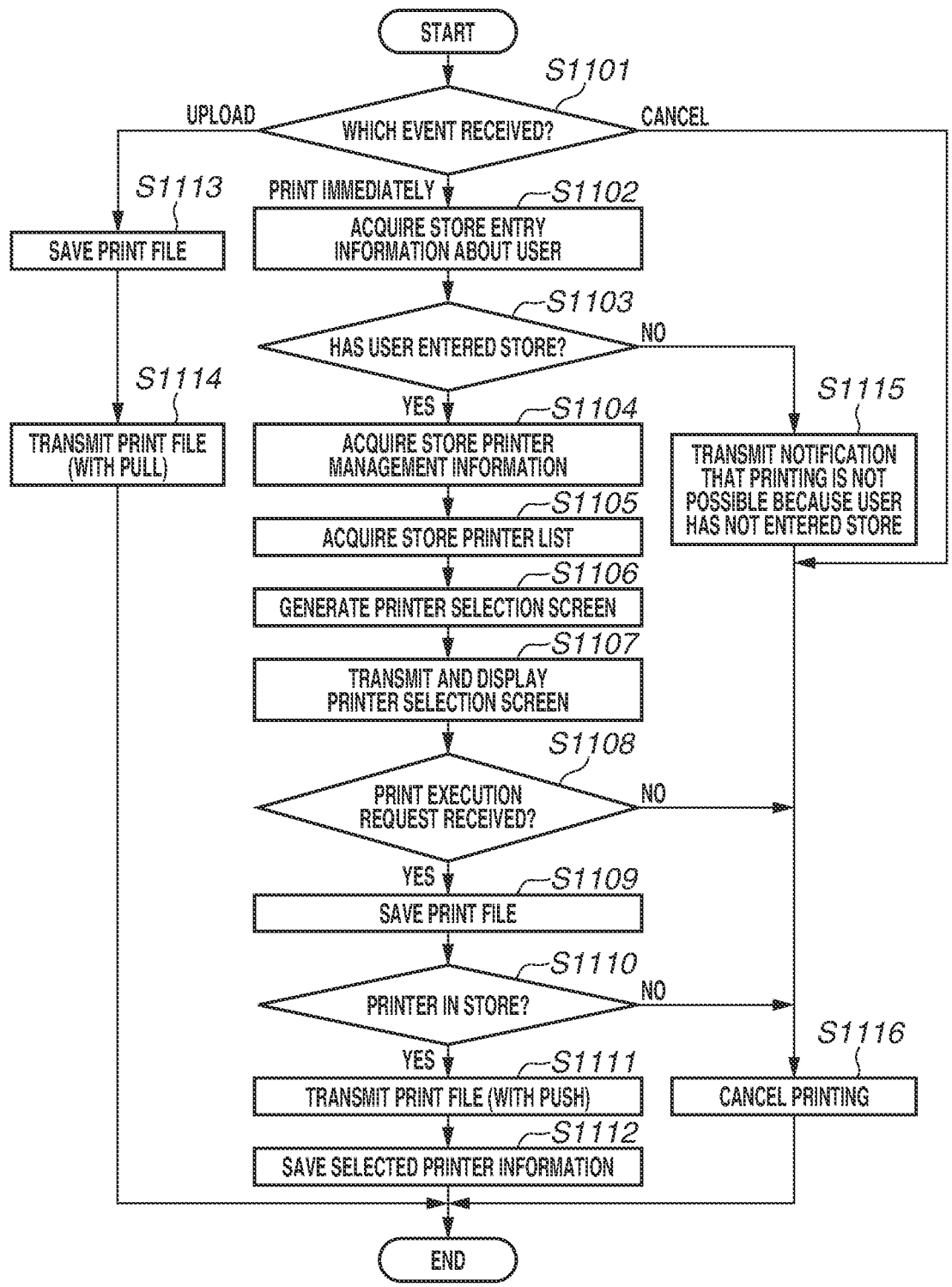
FIG. 11 is a flowchart illustrating a procedure of processing by a space matching service in printing.

FIG. 11 is a flowchart illustrating the print processing by the SMS 103. To be more specific, the flowchart illustrates the details of the processing performed by the SMS 103 after the instruction for printing immediately or uploading a job is issued by the user in step S703 of the processing sequence for output to the printer in the store that is illustrated in FIG. 10A.

In step S1101, the SMS 103 determines which event is received. More specifically, the SMS 103 determines which one of the "print immediately" button 1002, the "upload" button 1003, and the "cancel" button 1004 illustrated in FIG. 10A is pressed. In a case where the received event is "print immediately", the processing proceeds to step S1102. In a case where the received event is "upload", the processing proceeds to step S1113. In a case where the received event is "cancel", the processing proceeds to step S1116.

In step S1102, the SMS 103 acquires the store entry information 600 about the user. In step S1103, the SMS 103 determines whether the user has entered a store, by referring to the store entry information 600 about the user to determine whether a value is held in the store ID 602. In a case where the user has entered a store (YES in step S1103), the processing proceeds to step S1104. In a case where the user has not entered a store (NO in step S1103), the processing proceeds to step S1115. In step S1115, the SMS 103 transmits a notification that printing is not possible because the user has not entered a store. In step S1104, the SMS 103 acquires the store printer management information 900 having the store ID 901 identical to the store ID 602. In step S1105, the SMS 103 acquires the printer list 902 from the store printer management information 900. In step S1106, the SMS 103 generates the printer selection screen 1010 illustrated in FIG. 10B. At this time, a list of the printer name 904 is displayed in the printer list control 1011 based on the printer list 902 acquired in step S1105. In the printer list control 1011, the printer name 904 and the printer ID 903 are managed as a pair, so that the printer ID 903 can be acquired from the selected printer name. At this time, the printer last value information 800 may also be acquired, and in a case where the last used printer name 802 exists, this printer name may be brought into a selection state as an initial value.

In step S1107, the SMS 103 transmits the printer selection screen generated in step S1106 to the client terminal 101 to display this screen.

In step S1108, the SMS 103 determines whether a print execution request is received as an event based on an operation performed on the printer selection screen 1010. When the "OK" button 1012 is pressed, the SMS 103 determines that a print execution request is received (YES in step S1108) and the processing proceeds to step S1109. When the "cancel" button 1013 is pressed, the SMS 103 determines that a print cancel event is received (NO in step S1108) and the processing proceeds to step S1116. In step S1109, the SMS 103 saves the file received with the print execution request. In step S1110, the SMS 103 determines whether the image forming apparatus corresponding to the received print execution request is in the store, by determining whether the printer ID included in the parameter of the print execution request is included in the printer list 902 acquired in step S1105. In a case where the image forming apparatus is in the store (YES in step S1110), the processing proceeds to step S1111. In a case where the image forming apparatus is not in the store (NO in step S1110), the processing proceeds to step S1116. At this time, instead of the processing proceeding to step S1116 to cancel printing, job upload may be performed or the printer selection screen may be displayed again so that the image forming apparatus as the output destination can be selected again. In step S1111, the SMS 103 transmits the print file to the CPS 150 together with the parameter (push) indicating that printing is to be performed immediately. In step S1112, the SMS 103 associates the information about the image forming apparatus that has performed printing with the user ID 801 as the printer last value information 800, and saves the last used printer name 802 and the last used printer ID 803.

In step S1113, the SMS 103 saves a file received with a job upload request. In step S1114, the SMS 103 transmits the saved file to the CPS 150 together with the parameter (pull) indicating that the print file is to be held.

In step S1116, the print processing is canceled, and the processing ends.

As described above, in the present exemplary embodiment, the SMS 103 provides the list of print apparatuses installed in the store that the user has entered, based on the store entry and exit information about the user logging in to the SMS 103, to the client terminal 101. This makes it possible to, in a case where the user inputs a print job and simultaneously designates a print apparatus as an output destination, prevent the print job from being executed by a print apparatus outside the store.

In the first exemplary embodiment described above, the SMS 103 provides the list of print apparatuses installed in the store that the user has entered, based on the store entry and exit information about the user logging in to the SMS 103, to the client terminal 101.

Figure 12:
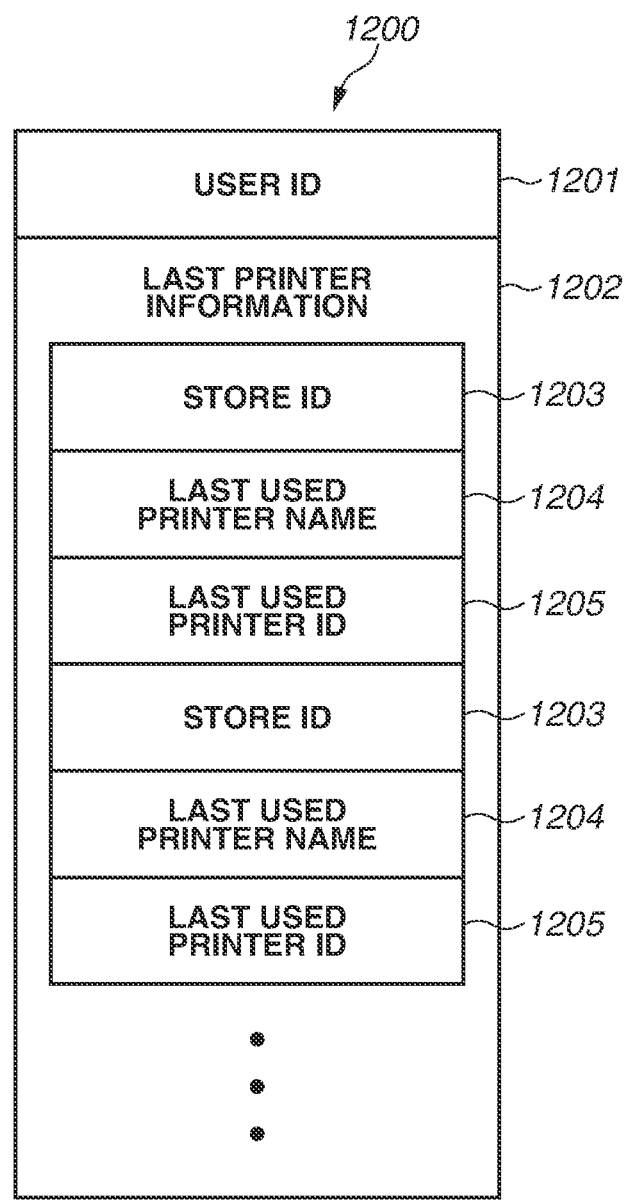
FIG. 12 is a diagram illustrating an example of a data structure of printer last value information for each store.

In a second exemplary embodiment, an example in which the printer last value information 800 illustrated in FIG. 8 according to the first exemplary embodiment is held for each store will be described with reference to FIG. 12.

As described above, the printer last value information 800 illustrated in FIG. 8 is used as information about the image forming apparatus to be initially selected on the printer selection screen, at the time of the second printing or later. However, in a case where the user performs printing in a store different from the store where the user has performed the first printing, the last used printer name 802 and the last used printer ID 803 held in the printer last value information 800 represent the image forming apparatus installed in the store different from the store where the user is present. Thus, the user is to select an image forming apparatus again whenever the user goes to another store. FIG. 12 illustrates a data structure in a case where the printer last value information 800 is held on a store-by-store basis to address such an issue.

Similarly to the printer last value information 800 illustrated in FIG. 8, store-specific printer last value information 1200 is managed in association with a user ID 1201. In last printer information 1202, last used printer information for each store is managed in a list in association with a store ID 1203. In the store ID 1203, the store ID of the store where an image forming apparatus that has performed printing is installed is stored. In a last used printer name 1204, the printer name of the image forming apparatus used in the store of the store ID 1203 is stored. In a last used printer ID 1205, the printer ID of the image forming apparatus used in the store of the store ID 1203 is stored. Using such a data structure makes it possible to apply the last printer information 1202 of the store where the user is currently present, to the image forming apparatus to be initially selected in the printer list control 1011 when the printer selection screen 1010 is displayed, if the last printer information 1202 exists. This enables the user to use an image forming apparatus used once before, without selecting the image forming apparatus again, in the case of using a plurality of stores.

The exemplary embodiments of the present disclosure enable the user to issue a print instruction from a client terminal after appropriately selecting an image forming apparatus, in a public print service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-140735, filed Aug. 31, 2021, which is hereby incorporated by reference herein in its entirety.

What is claimed is:

1. A management system configured to communicate with a client terminal via a network and provide a store management service, the management system comprising:
   one or more memories storing a set of instructions; and
   one or more processors that execute the set of instructions to:
   perform login processing for a user of the client terminal to log in to the management service, based on a login request from the client terminal;
   acquire store entry and exit information about the user; and
   provide the client terminal with information about one or more print apparatuses installed in a store that the user has entered, based on the acquired store entry and exit information.

2. The management system according to claim 1,
   wherein the one or more processors further execute the set of instructions to manage store entry and exit information about each user,
   wherein identification information about the user and identification information about the store that the user has entered are managed in association with each other based on a store entry request of the user, and
   wherein the association between the identification information about the user and the identification information about the store that the user has entered is canceled based on a store exit request of the user.

3. The management system according to claim 1, wherein the one or more processors further execute the set of instructions to:
   receive a print request including designation of a print apparatus as an output destination, from the client terminal; and
   process the received print request based on whether the print apparatus corresponding to the designation included in the received print request is a print apparatus installed in the store that the user has entered.

4. The management system according to claim 3,
   wherein, in a case where the print apparatus corresponding to the designation included in the received print request is not a print apparatus installed in the store that the user has entered, printing based on the print request is canceled, and
   wherein, in a case where the print apparatus corresponding to the designation included in the received print request is a print apparatus installed in the store that the user has entered, print data based on the print request is transferred to a print system communicable with the management system.

5. The management system according to claim 1,
   wherein the management system is further configured to communicate with a print system, and
   wherein the one or more processors further execute the set of instructions to acquire information about one or more print apparatuses installed in each store from the print system.

6. A control method for controlling a management system configured to communicate with a client terminal via a network and provide a store management service, the control method comprising:
   performing login processing for a user of the client terminal to log in to the management service, based on a login request from the client terminal;
   acquiring store entry and exit information about the user; and
   providing the client terminal with information about one or more print apparatuses installed in a store that the user has entered, based on the acquired store entry and exit information.

7. A non-transitory computer-readable storage medium on which is stored a computer program for making a computer execute a control method for controlling a management system configured to communicate with a client terminal via a network and provide a store management service, the control method comprising:
   performing login processing for a user of the client terminal to log in to the management service, based on a login request from the client terminal;
   acquiring store entry and exit information about the user; and
   providing the client terminal with information about one or more print apparatuses installed in a store that the user has entered, based on the acquired store entry and exit information.

* * * * *